United States Patent [19]

Koch et al.

[11] Patent Number: 5,122,588

[45] Date of Patent: * Jun. 16, 1992

[54] PREPARATION OF POLYARYL ETHER KETONES BY ELECTROPHILIC POLYCONDENSATION

[75] Inventors: Juergen Koch, Neuhofen; Gerhard Heinz, Weisenheim, both of Fed. Rep. of Germany

[73] Assignee: BASF Aktiengesellschaft, Ludwigshafen, Fed. Rep. of Germany

[*] Notice: The portion of the term of this patent subsequent to Jan. 4, 2009 has been disclaimed.

[21] Appl. No.: 480,663

[22] Filed: Feb. 15, 1990

[30] Foreign Application Priority Data

Mar. 4, 1989 [DE] Fed. Rep. of Germany ....... 3907027

[51] Int. Cl.[5] .................... C08G 8/02; C08G 75/00; C08G 69/26
[52] U.S. Cl. .................................. 528/179; 528/125; 528/126; 528/128; 528/172; 528/174; 528/219; 528/353
[58] Field of Search ............... 528/125, 353, 174, 172, 528/126, 128, 219, 176, 179, 180, 181

[56] References Cited

U.S. PATENT DOCUMENTS

| | | | |
|---|---|---|---|
| 3,441,538 | 4/1969 | Marks | 528/206 |
| 3,442,857 | 5/1969 | Thornton | 528/125 |
| 3,953,400 | 4/1976 | Dahl | 528/206 |
| 4,186,262 | 1/1980 | Freeman et al. | 528/128 |
| 4,636,557 | 1/1987 | Deckers | 528/128 |
| 4,820,790 | 4/1989 | Winslow et al. | 528/125 |
| 4,870,153 | 9/1989 | Matzner et al. | 528/125 |

FOREIGN PATENT DOCUMENTS

| | | |
|---|---|---|
| 135938 | 4/1985 | European Pat. Off. . |
| 3241444 | 5/1983 | Fed. Rep. of Germany . |
| 3542481 | 12/1984 | Fed. Rep. of Germany . |
| 3416445 | 7/1985 | Fed. Rep. of Germany . |
| 3416446 | 11/1985 | Fed. Rep. of Germany . |
| WO84/03891 | 10/1984 | PCT Int'l Appl. . |
| WO84/03892 | 10/1984 | PCT Int'l Appl. . |

*Primary Examiner*—Harold D. Anderson
*Assistant Examiner*—T. Mosley
*Attorney, Agent, or Firm*—Oblon, Spivak, McClelland, Maier & Neustadt

[57] ABSTRACT

Polyaryl ether ketones which contain units of the formula

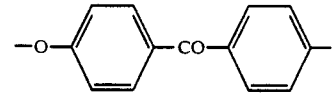

are prepared by electrophilic polycondensation in an inert solvent in the presence of a Lewis acid and in the presence or absence of a Lewis base using a carbonyl halide as monomer component, said carbonyl halide being an oxalyl dihalide or a mixture thereof with another carbonyl halide.

4 Claims, No Drawings

PREPARATION OF POLYARYL ETHER KETONES BY ELECTROPHILIC POLYCONDENSATION

The present invention relates to a process for preparing polyaryl ether ketones which contain units of the formula

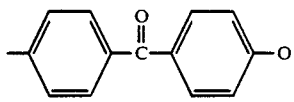

by electrophilic polycondensation using carbonyl halides as monomer component in an inert solvent in the presence of a Lewis acid and the presence or absence of a Lewis base.

Polyaryl ether ketones belong to the class of the high temperature resistant thermoplastics and combine good heat resistance with good mechanical properties and an excellent solvent resistance.

In principle, polyaryl ether ketones can be prepared nucleophilically or electrophilically, and the appropriate processes are described in the literature. In the electrophilic process, generally aromatic dicarbonyl halides or phosgene are reacted with suitable aromatic compounds which contain two hydrogen atoms which are displaceable by electrophilic substitution; or an aromatic carbonyl halide which contains not only an acid halide group but also a displaceable hydrogen atom is polycondensed with itself. The catalysts used are in general Lewis acids. U.S. Pat. No. 3,441,538, U.S. Pat. No. 3,442,857, U.S. Pat. No. 3,953,400, U.S. Pat. No. De. 3 241 444, U.S. Pat. No. De. 3 416 445 and U.S. Pat. No. De. 3 416 446 describe electrophilic polycondensation reactions using HF as solvent and $BF_3$ as catalyst.

In one version of the process, it is also possible to use halogenated hydrocarbons as solvent and other Lewis acids, eg. $AlCl_3$, as catalyst.

Finally, according to WO 84/03891 and WO 84/03892, it is advantageous to carry out the reaction in the presence of a Lewis base.

To prepare polyaryl ether ketones which contain units of the formula

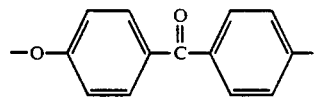

it is necessary to use carbonyl halides of diphenyl ether derivatives or phosgene as monomers. The first group of monomers, which includes for example p-phenoxybenzoyl chloride and 4,4'-oxydibenzoyl dihalides, is very complicated and expensive to prepare.

The use of phosgene as monomer has been described in the literature, for example in EP-A-135938 and DE-A-3542481. Since, however, phosgene is significantly less reactive than aromatic dicarbonyl halides, the products obtainable in this way only have unsatisfactorily low molecular weights. Another factor is that phosgene is extremely toxic and, being a gas, is very difficult to meter with the accuracy required for a polycondensation.

It is an object of the present invention to provide a process for preparing polyaryl ether ketones composed of units

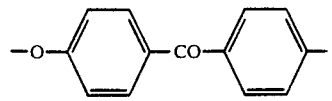

which is economical and safe to carry out and leads to products of sufficiently high molecular weight.

We have found that this object is achieved according to the present invention by a process for preparing a polyaryl ether ketone which contains units of the formula

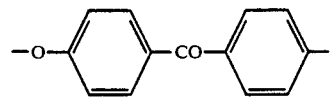

by electrophilic polycondensation in an inert solvent in the presence of a Lewis acid and in the presence or absence of a Lewis base using a carbonyl halide as monomer component, wherein the carbonyl halide used is an oxalyl dihalide or a mixture thereof with another carbonyl halide.

Preferred embodiments of the process according to the present invention may be found in the subclaims and the detailed description which follows.

The claimed process is suitable for preparing polyaryl ether ketones built of any desired repeat units as well as the units

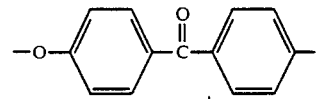

ie. basically any polymer where the main chain is made up of aromatic units joined together essentially by —CO— or —O— linkages. Besides these linkages, other linking units may also be present in minor amounts.

Preferred additional repeat units are those of the general formulae I and/or II or their ring-substituted $C_1$–$C_6$-alkyl, $C_1$–$C_6$-alkoxyaryl, chlorine or fluorine derivatives.

Units of the general formula I have the structure

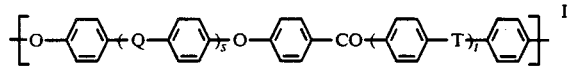

where s and t are each 0, 1, 2 or 3, Q and T may each be —O— or —CO— and, if S is 1 and Q is —CO—, t is not 0.

Units of the general formula II have the structure

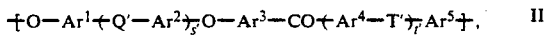

where $Ar^1$, $Ar^2$, $Ar^3$, $Ar^4$ and $Ar^5$ are each independently of the others m-phenylene, p-phenylene, biphenylene or naphthylene or a $C_1$–$C_6$-alkyl, $C_1$–$C_6$-alkoxy, aryl, chlorine or fluorine derivative thereof, Q' and T' are each —O— or —CO—, and s' and t' are each 0, 1, 2 or 3, with the proviso that at least one of $Ar^1$, $Ar^2$, $Ar^3$, $Ar^4$ and $Ar^5$ is m-phenylene, biphenylene or naphthylene or a $C_1$–$C_6$-alkyl, $C_1$–$C_6$-alkoxy, aryl, chlorine or fluorine derivative thereof.

Representatives of repeat units which come under the general formula I are the following:

substituents Q' and T' are each —CO— and those where the repeat units of the general formula II have the following structure:

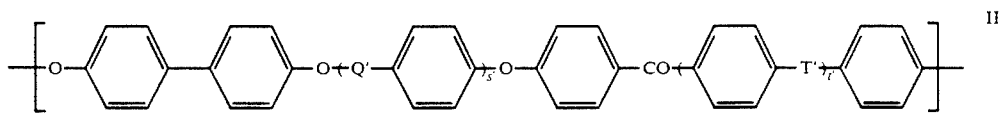

where the aromatic rings may be substituted by $C_1$–$C_6$-alkyl, $C_1$–$C_6$-alkoxy, aryl, chlorine or fluorine and Q', T', s' and t' are each as defined in claim 1, are preferred.

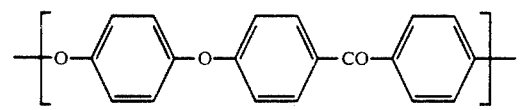 (I1)

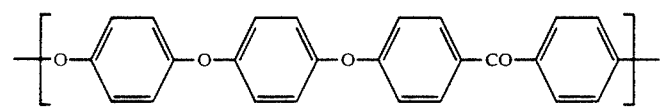 (I2)

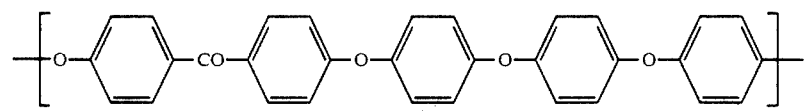 (I3)

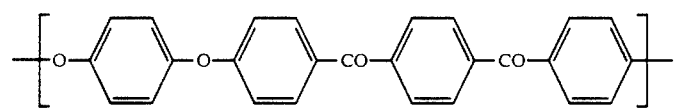 (I4)

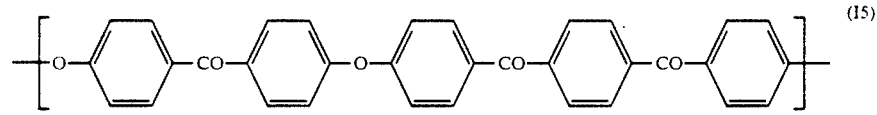 (I5)

In the case of the polyaryl ether ketones of repeat units of the general formula II, those where the two Representative examples of repeat units of the general formula II are the following:

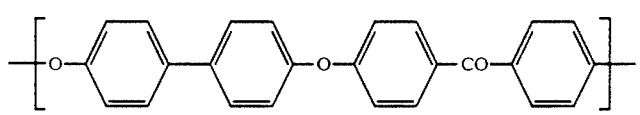 (II1)

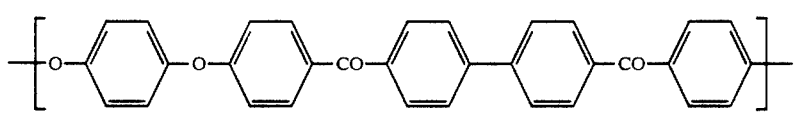 (II2)

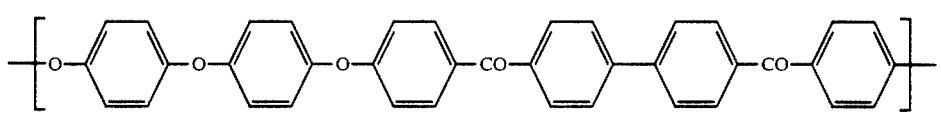 (II3)

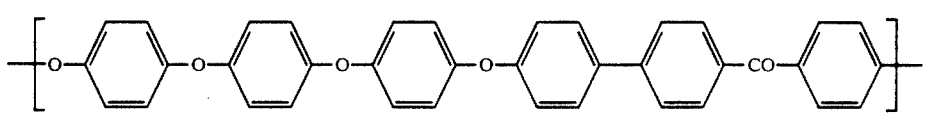 (II4)

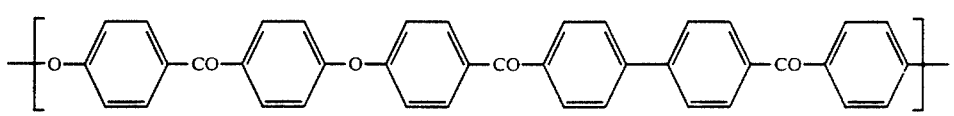 (II5)

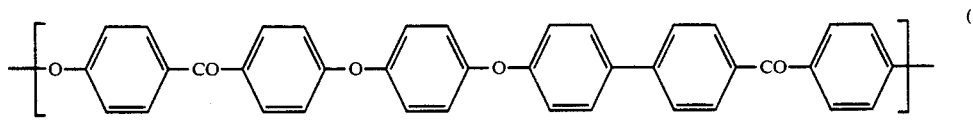

(II6)

The biphenylene in the formulae (II1)-(II6) may be replaced by naphthylene units.

The preparation of polyaryl ether ketones of the above-described structure by electrophilic polycondensation can be represented in principle by three general equations:

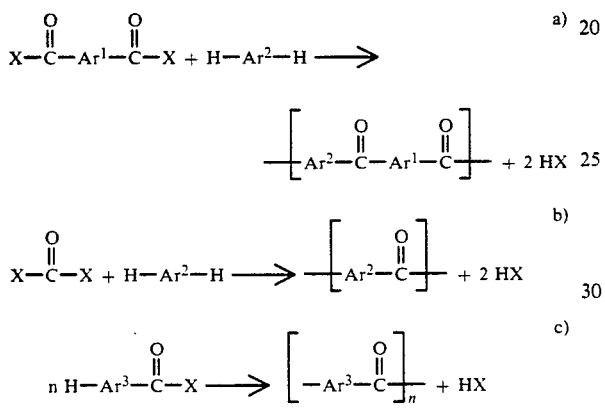

In these general equations, X is Cl, Br, F or I, preferably Cl, and Ar, $Ar^2$ and $Ar^3$ are each divalent aromatic radicals selected according to the repeat units of the desired polyaryl ether ketones.

As mentioned, the advantage of the process according to the present invention is that to prepare the repeat units

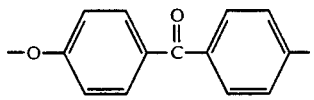

use is made not of phosgene or carbonyl halides of diphenyl ether derivatives but of oxalyl dihalides, preferably oxalyl dichloride, which compared with the diphenyl ether derivatives are significantly less costly and, compared with phosgene, have the advantage of easier meterability and lower toxicity.

The reaction with oxalyl dihalides, in particular oxalyl dichloride, proceeds extremely cleanly and selectively to the desired polyaryl ether ketone units.

The reaction conditions here are the same as commonly used for electrophilic synthesis. Besides the preferred oxalyl dichloride it is possible to use other carbonyl halides

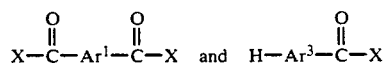

where $Ar^1$ and $Ar^3$ each preferably have the following meanings:

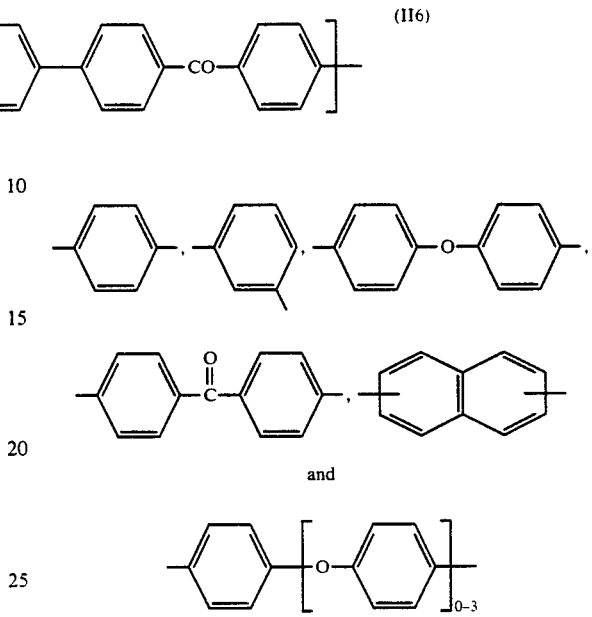

and the first three compounds mentioned being particularly preferred. Further suitable acid halides are described for example in U.S. Pat. No. 3,956,240.

Preferred compounds $HAr^2H$ as per the above reaction equations are for example diphenyl ether, 4,4'-diphenoxybenzophenone, 1,4-diphenoxybenzene and 4-phenoxybiphenyl. Further suitable compounds are for example revealed in previously cited U.S. Pat. No. 3,956,240 and U.S. Pat. No. 4,239,884, which are each hereby expressly incorporated herein by reference for further details.

The electrophilic polycondensation of the above-described monomers is carried out in a solvent which is inert under the reaction conditions in the presence of a Lewis acid. This Lewis acid is used in a molar excess, based on the molar amount of carbonyl groups or acid halides used, the magnitude of the molar excess being such that the reaction is catalyzed. In general, an excess of from 2 to 80, preferably from 5 to 30, mol % of Lewis acid, based on the amount of active carbonyl groups involved in the reaction, is sufficient for this purpose.

The necessary excess does of course also depend on the nature of the monomers used. If basic groups (eg. sulfone groups) are present in comonomers, it may be necessary to use a higher excess of Lewis acid.

Lewis acid covers for the purposes of the present invention basically any compound which is capable of accepting a lone electron pair from another compound. Examples are $AlCl_3$, $AlBr_3$, $Sb_2Cl_5$, $Sb_2F_5$, $InCl_3$, $GaCl_3$, $BCl_3$, $BF_3$, $ZnCl_2$, $FeCl_3$, $SnCl_4$, $TiCl_4$ and $MoCl_5$, of which in particular anhydrous $AlCl_3$ is preferred.

In a preferred embodiment of the process, the polycondensation is carried out in the presence of from 0.01 to 4 moles, preferably from 0.05 to 2 moles, of a Lewis base per mole of acid halide groups. The Lewis acid controls the reaction to a certain extent and suppresses, inter alia, undesirable side reactions (for example the ortho substitution of activated aryloxy groups). Suitable Lewis bases for these purposes are described in detail in WO 84/03891, which is hereby likewise incorporated herein by reference for further details. Examples are amides, amines, esters, ethers, ketones, nitriles, nitro compounds, phosphines, phosphine oxides, sulfides, sulfones, sulfonamides and sulfoxides, although care should be taken to ensure that the Lewis base does not on the one hand have an acylating, alkylating or arylating action and on the other is not itself acylated.

Preferred Lewis bases are N-methylformamide, N,N-dimethylformamide, N,N-dimethylacetamide, 1-methyl-2-pyrrolidone, acetone, benzophenone, dimethyl sulfone and alkali metal chlorides to name but a few.

The inert solvents used are preferably polar solvents whose dielectric constant is not less than 2.5, preferably from 4.0 to 25 (at 25° C.). Examples are methylene chloride, carbon disulfide, 1,2-dichloroethane, 1,1,2,2-tetrachloroethane, 1,2-dichlorobenzene and mixtures thereof.

A useful combination of Lewis acid and solvent is $BF_3$ and HF.

The temperature at which the reaction is carried out is in general within the range from $-50°$ C. to $+150°$ C., preferably within the range from $-20°$ C. to $+50°$ C.

It will be readily understood that all solvents and monomers used should be extremely anhydrous.

A preferred embodiment of the process according to the present invention comprises adding to the reaction mixture from 0.1 to 10 mol %, preferably from 0.2 to 8 mol %, based on the amount of carbonyl halide used, of a compound which converts carboxylic acids into their corresponding carbonyl halides, preferably their chlorides.

Advantageously, the compound is added to the reaction mixture prior to the start of the polycondensation, in particular prior to the addition of the acid halide, but in principle it can also still be added during the condensation, as long as no undesirable reactions have as yet occurred.

Compounds suitable for this purpose are in particular halogen compounds of phosphorus and of sulfur, the halogen compounds of phosphorus being preferred. Examples are $PCl_3$, $POCl_3$, $PCl_5$ and $SOCl_2$, of which phosphoryl trichloride is preferred.

After the polycondensation has taken place, the reaction mixture is worked up in a conventional manner. Preferably, a Lewis base is added for the purpose of degrading the Lewis acid/polymer complex and any amounts still present of the compound which was added to convert the acid into its halide. Examples of such Lewis bases are given in previously cited WO 84/03891. Preference is given to water and methanol and mixtures thereof. Following this decomplexing with or without comminution, the product may additionally be purified by extraction with a suitable solvent.

The process according to the present invention makes it possible simply to prepare polyaryl ether ketones of units O—ph—CO—ph— without having to use expensive or strongly toxic monomers.

EXAMPLE 1

(comparison, phosgene as acid halide)

A 1-L three-necked flask equipped with a stirrer, a nitrogen inlet means and an additional bent gas inlet tube down to the base of the vessel was charged with 200 ml of dried methylene chloride.

160.01 g (1.2 mol) of anhydrous aluminum trichloride was suspended therein at $-20°$ C. 56.477 g (0.600 mol) of dimethyl sulfone were slowly added. 68.084 g (0.400 mol) of diphenyl ether were added at $-15°$ C. The vessels and powder funnels for weighing out and metering in the materials were rinsed out with 20 ml of dry methylene chloride. 39.566 g (0.400 mol) of phosgene gas were then introduced at $-15°$ C. The temperature was increased to 25° C. in the course of 20 minutes, and the reaction mixture was maintained at that temperature for 24 hours. Even after this long reaction time there was no significant increase in the viscosity of the reaction mixture. The reaction mixture was removed from the flask and decomplexed and comminuted with 2 liters of ice-water in a food blender. The polymer powder obtained was extracted 5 times for 30 minutes with 5 liters of boiling water and dried at 150° C. under reduced pressure.

The polymer thus obtained had the structure

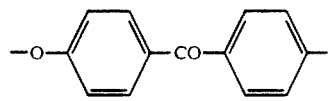

and an inherent viscosity of 0.218 (measured in concentrated sulfuric acid, 0.5 g/100 ml).

EXAMPLE 2

A 1-L three-necked flask equipped with a stirrer and nitrogen inlet means was charged with 200 ml of dried methylene chloride. 225.29 g (1.69 mol) of anhydrous aluminum trichloride were suspended therein at $-20°$ C. 56.477 g (0.600 mol) of dimethyl sulfone were slowly added. 68.084 g (0.400 mol) of diphenyl ether were added at $-20°$ C., followed by 50.772 g (0.400 mol) of freshly distilled oxalyl dichloride added dropwise with continuous cooling. The vessels and powder funnels used for weighing out and metering in the starting materials were rinsed out with 20 ml of dry methylene chloride.

The temperature was increased to 15° C. in the course of 20 minutes, kept at that level for 30 minutes, then raised to 25° C. and kept at that level for 6 hours. In the course of this time, the reaction mixture foamed up and solidified to form a rubberlike mass. After the reaction had ended, the mass was removed from the flask, precomminuted by cutting with a knife and decomplexed with 2 liters of ice-water and further comminuted in a food blender. The polymer flakes obtained were extracted 5 times for 30 minutes with 5 liters of boiling water and dried at 150° C. under reduced pressure.

The polymer thus obtained had an inherent viscosity of 0.81, a glass transition temperature of 163° C. and a melting point of 363° C.

The infrared spectrum, the $^{13}C$ nuclear magnetic resonance spectrum and elemental analysis were in agreement with the structure

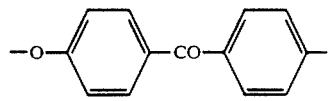

Subunits of the structure

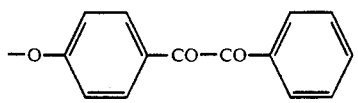

were spectroscopically not detectable.

EXAMPLE 3

The reaction conditions described in Example 2 were employed to react
146.119 g (1.096 mol) of aluminum chloride,
28.239 g (0.300 mol) of dimethyl sulfone,
1.237 g (0.009 mol) of benzoyl chloride,
25.386 g (0.200 mol) of oxalyl dichloride and
74.896 g (0.204 mol) of 4,4,-diphenoxybenzophenone
in 220 ml of dichloromethane.

The polymer thus obtained had an inherent viscosity of 0.818. The infrared spectrum and the $^{13}C$ NMR spectrum were in agreement with the structure

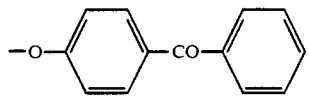

The polymer had a decomposition temperature (5% weight loss under nitrogen, heating rate 10°/min) of 535° C.

EXAMPLE 4

The reaction conditions described in Example 2 were employed to react
196.960 g (1.477 mol) of aluminum chloride,
35.298 g (0.375 mol) of dimethyl sulfone,
1.054 g (0.008 mol) of benzoyl chloride,
31.733 g (0.250 mol) of oxalyl dichloride and
66.561 g (0.254 mol) of 1,4-diphenoxybenzene
in 200 ml of methylene chloride.

The polymer thus obtained had an inherent viscosity of 0.870. The glass transition temperature was 145° C., and the melting point was 344° C. The infrared spectrum and the $^{13}C$ nuclear magnetic resonance spectrum were in agreement with the structure

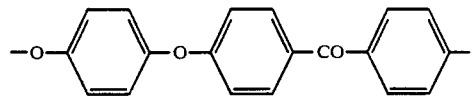

We claim:

1. A process for preparing a polyaryl ether ketone which contains units of the formula

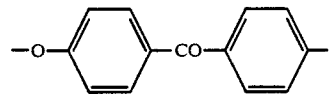

comprising polycondensing electrophilically (1) at least one aromatic compound containing at least two hydrogen atoms displaceable by electrophilic substitution and (2) an oxalyl dihalide or a mixture thereof with another carbonyl halide, in an inert solvent in the presence of a Lewis acid and in the presence or absence of a Lewis base.

2. A process as claimed in claim 1, wherein a compound which converts carboxylic acids into their halides is added before or together with the carbonyl halide.

3. A process as claimed in claim 1, wherein the polycondensation is carried out in the presence of a Lewis base.

4. A process as claimed in claim 1, wherein the compound which is used to convert the carboxylic acid into its halide is a halogen compound of phosphorus or of sulfur.

* * * * *